United States Patent [19]
Parzefall

[11] Patent Number: 5,076,717
[45] Date of Patent: Dec. 31, 1991

[54] POLYMERIC SLIDING SLEEVE FOR CLUTCH RELEASE BEARINGS

[75] Inventor: Walter Parzefall, Bubenreuth, Fed. Rep. of Germany

[73] Assignee: Ina Walzlager Schaeffler KG, Herzogenaurach, Fed. Rep. of Germany

[21] Appl. No.: 497,237

[22] Filed: Mar. 22, 1990

Related U.S. Application Data
[63] Continuation of Ser. No. 911,911, Mar. 25, 1986, abandoned.

[30] Foreign Application Priority Data

Oct. 3, 1985 [DE] Fed. Rep. of Germany ....... 3535263

[51] Int. Cl.$^5$ ............................................. F16C 27/04
[52] U.S. Cl. .................................... 384/611; 384/620
[58] Field of Search ............... 384/276, 297, 215, 903, 384/535, 581, 611, 620

[56] References Cited

U.S. PATENT DOCUMENTS 1,465,181  8/1923  Briney ................................. 384/276
4,319,790  3/1982  Thomson .......................... 384/297

*Primary Examiner*—Lenard A. Footland
*Attorney, Agent, or Firm*—Bierman and Muserlian

[57] ABSTRACT

A sliding sleeve made of polymeric material for clutch release bearings comprising a hollow cylindrical hub element (1) provided with a radially outwardly directed ring collar (3) on its outer surface, a ring-shaped metal flange (4) abutting against the surface of the collar (3) facing the clutch forming a stop surface 5 for a radially adjustable raceway of a roller bearing, characterized in that the metal flange (4) has at least one axially directed collar (6,9) extending over at least part of its inner and/or outer circumference surface, the collar resting on the outer surface (2,10) of the hub element (1) and/or the ring collar (3) under radial prestress.

1 Claim, 1 Drawing Sheet

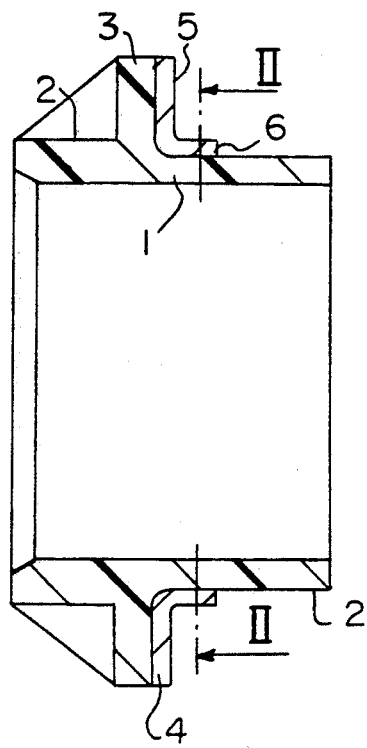
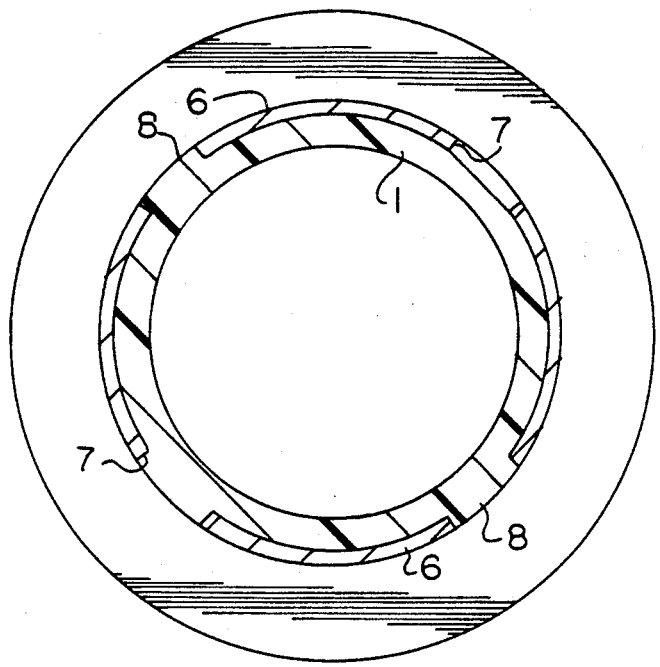
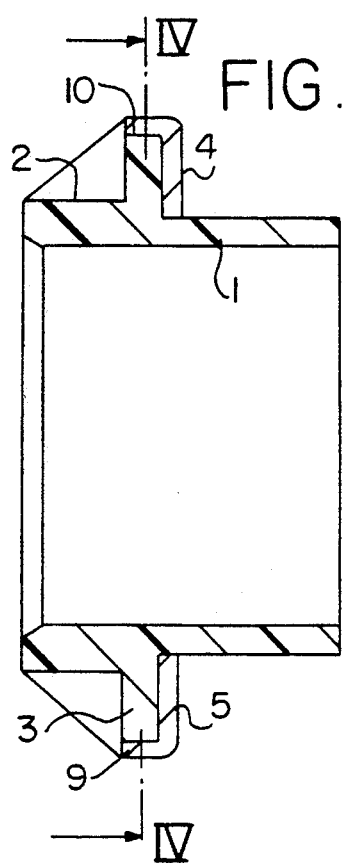
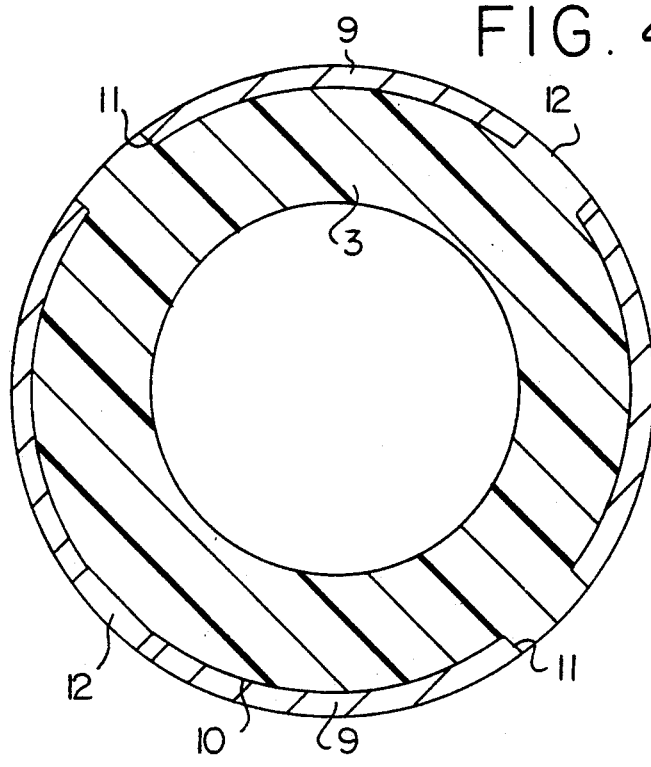

POLYMERIC SLIDING SLEEVE FOR CLUTCH RELEASE BEARINGS

PRIOR APPLICATION

This application is a continuation of U.S. Pat. application Ser. No. 911,911 filed Sept. 25, 1986, now abandoned.

STATE OF THE ART

Sliding sleeves made of polymer material for clutch release bearings comprising a hollow cylindrical hub element provided with a radially outwardly directed ring collar on its outer surface and an essentially ring-shaped metal flange abutting against the collar surface facing the clutch to form a stop surface for a radially adjustable raceway of a roller bearing are known. With such sliding sleeve made of polymeric material, there is the danger that the ring collar can deform in an uncontrollable manner as a result of material accumulations and/or recesses formed when cooling, so that the stop surface for the essentially ring-shaped metal flange is no longer uniform. If this flange rests only against the ring collar, this can result in the flange executing relative and tipping movements relative to the sliding sleeve when under stress which results in premature wear on the hub element and failure of the clutch release bearing.

OBJECTS OF THE INVENTION

It is an object of the invention to provide an economical sliding sleeve for a clutch release bearing which will avoid wear phenomena even if the ring collar is possibly deformed.

This and other objects and advantages of the invention will become obvious from the following detailed description.

THE INVENTION

The novel sliding sleeve of the invention made of polymeric material clutch release bearings comprises a hollow cylindrical hub element (1) provided with a radially outwardly directed ring collar (3) on its outer surface, a ring-shaped metal flange (4) abutting against the surface of the collar (3) facing the clutch forming a stop surface 5 for a radially adjustable raceway of a roller bearing, characterized in that the metal flange (4) has at least one axially directed collar (6,9) extending over at least part of its inner and/or outer circumference surface, the collar resting on the outer surface (2,10) of the hub element (1) and/or the ring collar (3) under radical prestress. By this construction, the essentially ring-shaped metal flange is perfectly guided along the outer surface of the hub element and/or the ring collar even if there is an uneven contact surface on the ring collar and there is no type of tipping movement possible.

German G.M. 8,137,226 describes a sliding sleeve for clutch release bearings wherein the segment of the pressure ring which locks into the hub element is provided with at least two radially inwardly directed tabs in the vicinity of the bore, the free segments of the tabs being angled in an axial direction. However, the pressure ring of this sleeve is cast into the hub element and the angled segments essentially act to prevent rotation.

In another embodiment of the invention, there is provided at least one radially extending recess in the vicinity of the axially facing collar, which recess has a positive lock effect together with a corresponding projection of the hub element or the ring collar. In this way, a secure connection which prevents rotation of the metal flange relative to the hub element is created by simple means.

Referring now to the drawings:

FIG. 1 is a longitudinal cross-section of a sliding sleeve of the invention and FIG. 2 is a cross-section taken along line II—II of FIG. 1, FIG. 3 is a longitudinal cross-section of another embodiment of a sliding sleeve of the invention and FIG. 4 is a cross-section taken along the line IV—IV in FIG. 3.

In FIGS. 1 and 2, the sliding sleeve made of polymeric material comprises a hollow cylindrical hub element 1 provided with a radially outwardly directed ring collar 3 on its outer surface 2 and a ring-shaped metal flange 4 rests against the surface of the ring collar facing the clutch, which flange forms a stop surface 5 for a radially adjustable raceway of a roller bearing not shown. In FIGS. 1 and 2, the metal flange 4 has an axially directed collar 6 at its inner circumference surface, which collar abuts against the outer surface 2 of the hub element 1 with radial prestress. As FIG. 2 shows, there are radially extending recesses 7 in the area of the collar 6 which act together with corresponding projections 8 of the hub element 1.

In the embodiment of FIGS. 3 and 4, the metal flange 4 has an axially directed collar 9 on its outer circumference surface which abuts against the outer surface 10 of the ring collar 3 with radial prestress. Here also, there are radially extending recesses 11 in the collar 9 which act together to form a positive lock with the corresponding projections 12 of the ring collar 3.

Various modifications of the sleeve of the invention may be made without departing from the spirit or scope thereof and it is to be understood that the invention is intended to be limited only as defined in the appended claims.

What I claim is:

1. A sliding sleeve made of polymeric material which is to be used in a clutch release bearing comprising a hollow cylindrical hub element (1) provided with a radially outwardly directed ring collar (3) on its outer surface, a ring-shaped metal flange (4) abutting against the surface of the collar (3) facing the clutch, said metal flange acting as a stop surface (5) for a radially adjustable raceway of a rolling bearing, the improvement comprising that the metal flange (4) has at least one axially directed collar (6,9) extending over at least a part of its inner and/or outer circumferential surface, the collar (6,9) resting under radial prestress over its entire circumference on the outer surface (2,10) of the hub element (1) and/or the ring collar (3) and there is at least one radially extending recess (7,11) in the area of the axially directed collar (6,9) which act together to form a positive lock with a corresponding projection (8,12) of the hub element (1) or the ring collar (3).

* * * * *